United States Patent
Seki et al.

(10) Patent No.: US 10,736,268 B2
(45) Date of Patent: Aug. 11, 2020

(54) HEADER FOR A HARVESTING MACHINE

(71) Applicant: CNH Industrial America LLC, New Holland, PA (US)

(72) Inventors: Andre Seki, Sorocaba (BR); Luiz Balestrin, Botucatu (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/199,032

(22) Filed: Jun. 30, 2016

(65) Prior Publication Data

US 2017/0000026 A1    Jan. 5, 2017

(30) Foreign Application Priority Data

Jun. 30, 2015  (BR) .................. 10 2015 0159226

(51) Int. Cl.
  *A01D 45/10*  (2006.01)
  *A01D 34/66*  (2006.01)

(52) U.S. Cl.
  CPC ........... *A01D 45/10* (2013.01); *A01D 34/661* (2013.01)

(58) Field of Classification Search
  CPC combination set(s) only.
  See application file for complete search history.

(56) References Cited

U.S. PATENT DOCUMENTS

| | | | |
|---|---|---|---|
| 2,953,886 A * | 9/1960 | Errington | A01D 45/10 56/13.9 |
| 3,791,114 A | 2/1974 | Fowler | |
| 3,945,177 A * | 3/1976 | Scott | A01D 45/10 56/12.7 |
| 4,035,996 A * | 7/1977 | Fernandez | A01D 45/10 56/13.9 |
| 4,154,047 A | 5/1979 | Quick | |
| 4,170,098 A * | 10/1979 | Moreno | A01D 45/10 56/13.4 |
| 4,470,244 A * | 9/1984 | Leigers | A01D 63/02 56/13.9 |
| 6,508,049 B1 | 1/2003 | Cox | |
| 8,240,115 B2 * | 8/2012 | Marchini | A01D 75/28 56/63 |
| 10,356,982 B2 * | 7/2019 | Bertino | A01D 63/02 |
| 2014/0165522 A1 * | 6/2014 | Braunbeck | A01D 45/10 56/10.6 |
| 2014/0352272 A1 | 12/2014 | Parker et al. | |

FOREIGN PATENT DOCUMENTS

WO    2014127005 A1    8/2014

* cited by examiner

*Primary Examiner* — Alicia Torres

(74) *Attorney, Agent, or Firm* — Peter Zacharias; Patrick Sheldrake

(57) ABSTRACT

A header for a harvesting machine. The header includes at least two row dividers spaced from one another in a transversal direction and at a predetermined distance, at least one roller, a driving for driving the roller comprising multiple projections, at least two base cutting discs, a driver for driving the at least two base cutting discs, one roller positioned behind the at least two base cutting discs to raise the cut plants, and at least one conveyor roller positioned above the said roller to raise plants, to transport the cut plants to the inside of a harvesting machine. The at least one roller includes multiple projections to collect and direct the plants downwards and towards the opening. The foregoing elements form an assembly mounted on a structure that may be connected to a harvesting machine.

16 Claims, 5 Drawing Sheets

Fig. 3

HEADER FOR A HARVESTING MACHINE

CROSS REFERENCE TO RELATED APPLICATION

This application claims priority to Brazilian Application No. 10 2015 015922 6, filed Jun. 30, 2015, the contents of which are incorporated herein by reference.

FIELD OF THE INVENTION

The invention refers in general to a header for a harvester, and more specifically, the invention is related to a header for a harvester that allows the insertion and removal thereof into/from a harvesting machine, such as a sugarcane harvester.

BACKGROUND OF THE INVENTION

There are known harvesting machines for various types of crops, such as sugarcane harvesting machines, grain-harvesting machines and forage harvesters. The purpose of such machines, in general, is to enhance the harvesting productivity of vegetable crops such as, without limitation, crops of sugarcane, sweet sorghum, wheat, soy, corn, etc.

In the case of tall and stalky plants, such as in the case of sugarcane, energy cane and sweet sorghum, the harvesters are machines designed to harvest this specific type of crop, due to their intrinsic characteristics. Therefore, the harvesting machine generally presents a fixed opening to receive and harvest the crop rows, that are generally spaced from one another at relatively fixed and predetermined distances of 0.9 m or 1.5 m, or yet machines intended to harvest two simultaneous rows within these spacing. Optionally, the machine for harvesting these types of crops may also present a variable opening, to harvest optionally one or two rows of crop with spacing of 0.9 m or 1.5 m between one another, or rows of crop with alternate spacing of 0.9 m and 1.5 m. One solution proposed for a sugarcane harvester with adjustment of the opening to harvest crops having different spacing is disclosed, for example, in publication WO 2014/026255, incorporated herein as a reference.

In turn, the grain harvesting machines generally have a configuration that allows the harvesting of various types of grains, wherein a header is attached to the front portion of the machine, depending on the crop to be harvested, such as wheat, soy, corn, rice, etc.

The forage harvesters, in turn, are machines intended to harvest and thresh a given crop for forage, such as hay.

The cultivation of sugarcane and sweet sorghum is undergoing a great evolution, both in terms of the development of new varieties of plants, and in terms of different planting configurations, always with a view to increase productivity, both with regard the quantity of tons harvested by hectare and with relation to the amount of ethanol and/or sugar produced per harvested ton. Additionally, there are also being developed applications for the generation of energy from the biomass of sugarcane or sweet sorghum wherein, differently from the production of ethanol and sugar, not only the part of the stalk of the plant is used, but also the foliage, and eventually the inflorescence. Sugarcane varieties intended for the production of energy, commonly designated as energy cane, are also being developed, in which it is sought to increase the quantity of fibers and reduce the amount of sucrose concentrated in the plant.

The problem is that the harvesters of sugarcane and sweet sorghum are sensitive to the planting rows, that is, they can only harvest the crop if the same is planted in determined planting rows, such as planting rows spaced by 0.9 m or 1.5 m or lines alternately spaced by 0.9 m and 1.5 m. If the crop is intended for the generation of biomass, the planting in rows may not be necessary, that is, the planting may be made randomly and in that sense, the sugarcane and sweet sorghum harvesting machines cannot be used.

One might replace the sugarcane and sweet sorghum harvesting machines with forage harvesters. However, forage harvesters also do not show efficiency for harvesting stalky and tall plants, such as the sugarcane and the sweet sorghum, aiming at the generation of energy from biomass, since they use a system that, almost immediately after the cutting of the plant, chops the harvested crop. This action of chopping, or cutting in small pieces, is disadvantageous in the case of stalky and tall plants, since it causes the plant to lose much of its mass, including its juices, into the environment, and thus an important part of the biomass that might be used for the production of energy is also lost.

In order to attempt to sidestep this inconvenience, publication US 2014/0174048, of W. T. Lawson et al., discloses a biomass harvesting system that consists, basically, in a sugarcane harvester that can be adapted by withdrawing the base cutting discs and other elements from the front part of the machine and installing a rollers device, in order to be able to receive the header of a forage harvester, for example to harvest a crop, such as a sugarcane or sweet sorghum crop, that were planted without a specific pattern of planting rows. This solution solves the problem, on one hand, of harvesting stalky and tall plants without a specific planting pattern, and on the other hand, of replacing the forage harvester in the harvest of such crop, avoiding the loss of a part of the harvested biomass, and thus taking maximum advantage of the crop.

The problem is that if a farmer wishes to alternate the crops, for example, due to seasonal or market factors, it is necessary to disassemble the sugarcane harvesting machine to insert the rollers device and assemble the header of a forage harvester, and in the opposite case, withdraw the forage header and the rollers device and reassemble the parts that make up the original sugarcane harvester.

Therefore, the flexibility for the destination of the crop is limited by the machines available in the market, or if one intends to achieve such flexibility, it is necessary to have at least two types of machines for different applications, or to realize constant alterations in the existing machines, which requires time and specialized manpower, the latter not always available in remote planting areas.

It is desirable, therefore, that the sugarcane harvesting machines have a greater flexibility to harvest crops having different planting spacing. It is also desirable that the producer may enjoy flexibility in the destination of the planted crop, either for the production of sugar and ethanol, or for the generation of biomass.

It is also desirable that the farmer have flexibility to harvest a crop planted in different planting rows or a crop planted without any pattern of planting rows.

SUMMARY OF THE INVENTION

In accordance with an aspect of the present invention, there is provided a sugarcane-harvesting machine that may harvest crops having different planting spacing. Flexibility between harvesting a crop intended for the production of ethanol and sugar and a crop intended for the production of biomass for the generation of energy is desirable.

In accordance with another aspect of the present invention, there is provided a harvesting machine that has the flexibility to harvest crops planted at regular spacing intervals or harvesting rows or crops planted without any regularity.

In accordance with still another aspect of the present invention, there is provided a header for a harvesting machine, comprising:

at least two row dividers spaced from one another in a transversal direction and at a predetermined distance, the said at least two row dividers defining an opening to receive plants;

at least one roller comprising multiple projections to collect and direct the plants downwards and towards the said opening, the said roller comprising multiple projections being positioned transversally with relation to the said opening and behind the said at least two row dividers;

means for driving the said roller comprising multiple projections;

at least two base cutting discs positioned within the said opening to receive plants, each disc of the at least two cutting discs positioned in a position substantially transversally aligned in relation to one another and in relation to the said opening;

driving means to drive the at least two base cutting discs;

one roller positioned behind the at least two base cutting discs to raise the cut plants towards a conveyor roller; and at least one conveyor roller positioned above the said roller to raise plants, to transport the cut plants to the inside of a harvesting machine;

wherein the said at least two row dividers, said at least one roller comprising multiple projections, said at least two base cutting discs, said driving means, said roller and conveyor roller form an assembly mounted on a structure, the said structure defining a header that may be connected to a harvesting machine.

In accordance with alternative and/or additional aspects of the present invention, the following characteristics, alone or in technically feasible combinations, can also be present:

the said harvesting machine is a sugarcane or sorghum harvesting machine;

the said row divider comprises two spiral-shaped cylinders ("lollypops") positioned adjacent to one another forming a "V";

the said row divider additionally comprises a disc positioned in front of the divider and provided to cut the foliage from the plants;

the said header also comprises internal sidewalls that extend from the row divider to the base cutting disc;

the said driving means consist in a hydraulic motor, an electric motor, a gearbox or combinations thereof;

the said header comprises additionally two conveyor rollers provided one above the other and positioned behind the said roller provided to raise the cut plants;

at least one of the conveyor rollers is a floating roller;

the said header comprises additionally a stem that extends towards the most frontal portion of the header to bend the plants prior to cutting; and the said cutting discs comprise a connecting shaft between the said discs and the said driving means, wherein the said stem comprises additionally an element that extends radial and radially along and outside the shaft.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 3 is a front view of the header of FIG. 1, in accordance with an exemplary embodiment of the present invention;

DETAILED DESCRIPTION OF THE INVENTION

Figure 1:
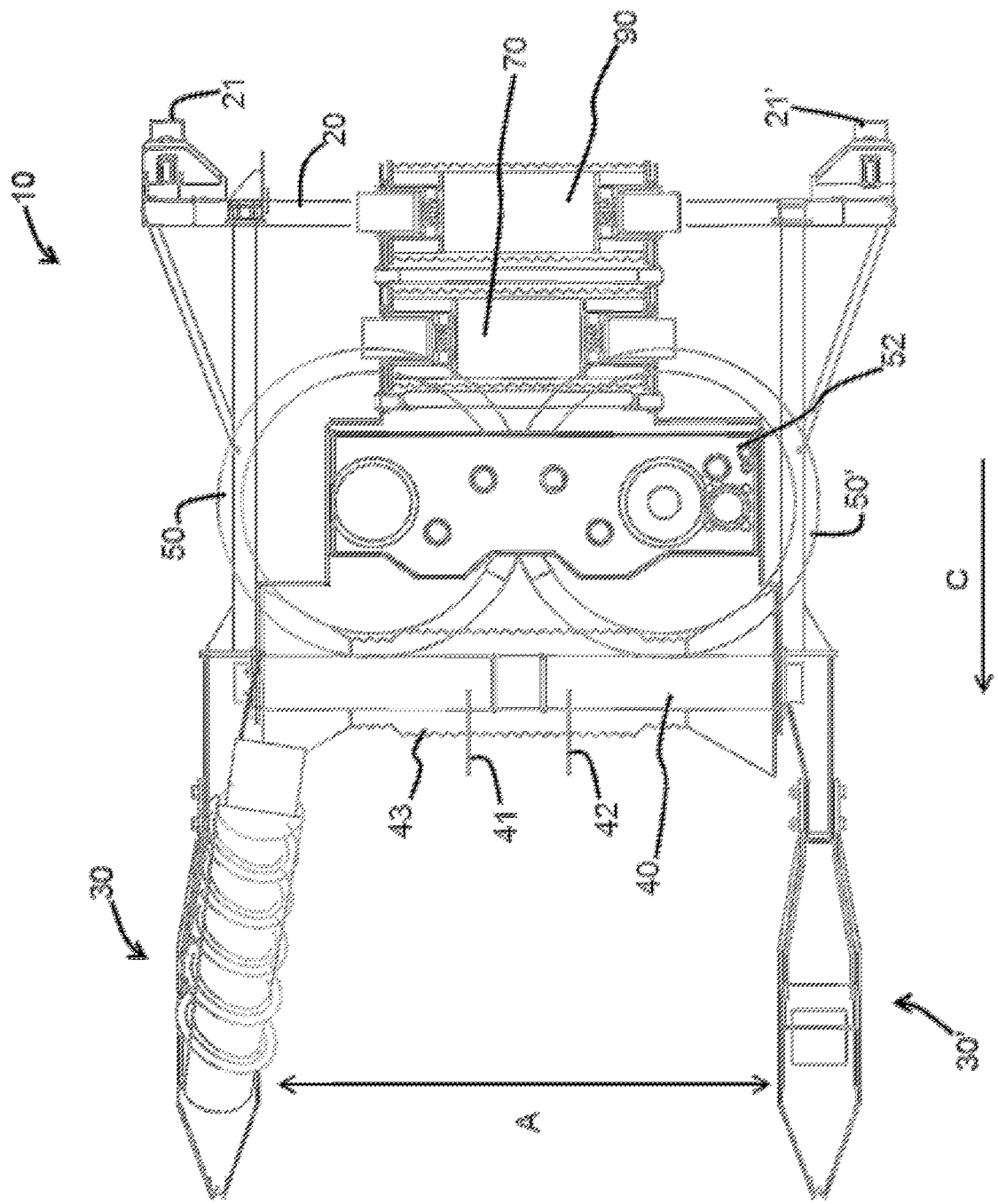
FIG. 1 is a top view of a header, in accordance with an exemplary embodiment of the present invention.

The reference numerals indicated in the figures are repeated along the various views to indicate equal or similar technical characteristics. Furthermore, the terms: above, below, upper, lower, lateral, right, left, frontal, rear and their variants should be interpreted according to the orientation given in FIG. 1.

Figure 2:
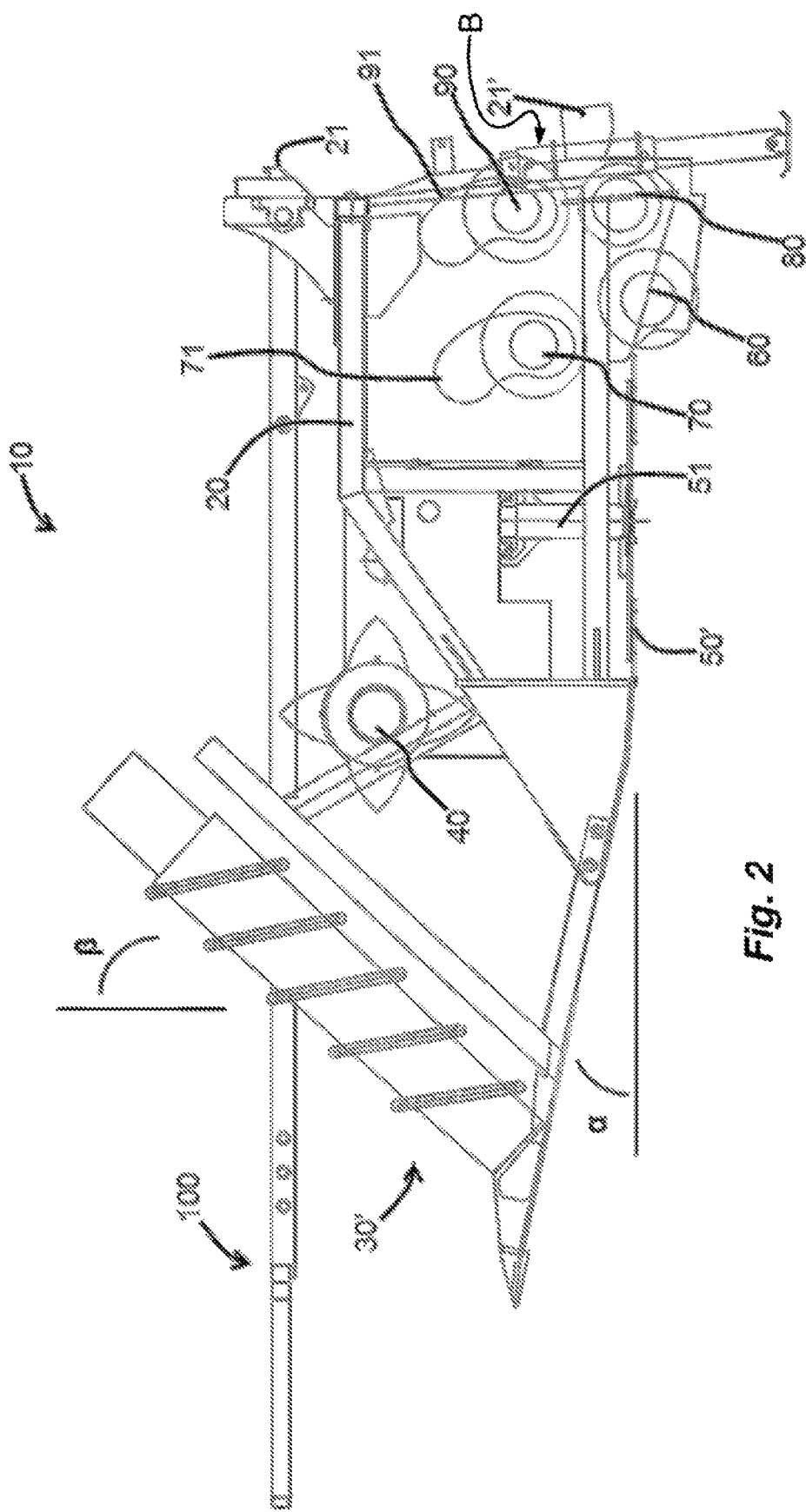
FIG. 2 is a partially cross-section view of the header of FIG. 1, in accordance with an exemplary embodiment of the present invention.
Figure 3:
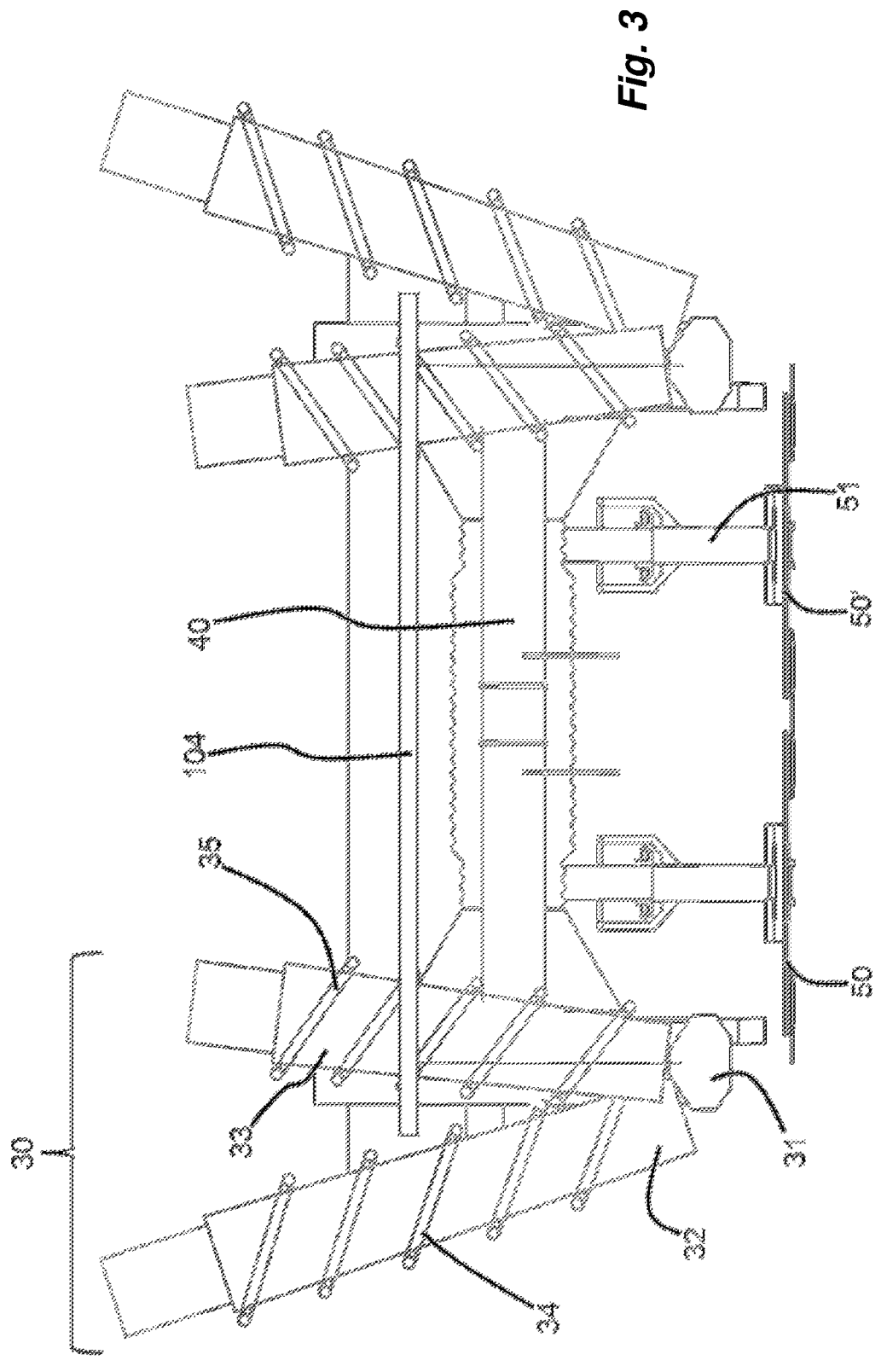

With reference to FIGS. 1 to 3, there is disclosed a form of concretization of a header 10, in accordance with an exemplary embodiment of the present invention. The header comprises a structure 20 that may be connected to or disconnected from a harvesting machine, and particularly from a sugarcane-harvesting machine. Still more particularly, the sugarcane harvesting machine may be a machine that was modified: the frontal elements having been withdrawn, such as row dividers, bending and/or feeding rollers etc., as well as the base cutting discs that are positioned at the lower front part of the machine, and there may have been received a roller device, such as a machine described in publication US 2014/0174048, which description is incorporated hereby as a reference.

The structure 20 of the header is preferably a tubular metallic structure, which may have an arrangement and dimensions adequate to receive the elements that constitute the header and that are described in further detail below, such as, without limitation, row dividers, bending and/or feeding rollers, drive motors, raiser and/or conveyor rollers, etc.

The structure, together with its elements, forms a unit of the header that may be connected to or disconnected from a harvesting machine, such as a sugarcane harvester, and for that purpose, it should also provide means of connection 21, 21' to the machine. Such connection means 21, 21' may be any means adequate for the connection and attachment of the header described herein to a harvesting machine, particularly a sugarcane harvester, and may consist, for example, of a flange comprising openings to receive fastening means, such as bolts or pins. Alternatively, this flange may consist in a hook, attached to the machine by means of a lock, for example. The connecting means 21, 21', in that sense, may vary and are not relevant to the scope of the present invention, and one skilled in the art may realize various forms of connecting and attaching the structure 20 to a harvesting machine depending on the forms of attachment available in the harvesting machine, which may be defined by design determinations.

According to FIG. 1, the header 10 is provided to realize the harvesting of tall and stalky plants, such as sugarcane and sweet sorghum, in a harvesting direction as indicated by the arrow C. In that regard, the terms frontal, rear, lateral, right, left, etc. and their variants should be interpreted according to the orientation given in FIG. 1 and according to the indicated harvesting direction.

At the front part of the header there is provided at least one, and particularly two row dividers 30, 30' spaced from one another in a predetermined transversal direction A with relation to the harvesting direction, thereby defining an opening to receive the plants that are harvested. Such row dividers may consist in conventional row dividers already found in the market comprising a shoe 31 that is supported on the ground and wherefrom extend two rotating spindles 32, 33 (also known as "lollypops") provided side by side in a combination in V at a determined angle. Each of the said "lollypops" has a spiral 34, 35 and they are generally driven by a hydraulic motor to rotate around their axes, with the outermost "lollypop" 32 turning in one sense such that the spiral 33 conveys the plants outwards with relation to the opening A, and the internal "lollypop" 34 turns in a sense such that the spiral 35 conveys the plants inwards relatively to the opening A. Naturally, the turning direction of rotation of each "lollypop" 32, 33 may vary, depending on the arrangement of the spirals, as may be observed by those skilled in the art, provided that the row divider 30 accomplishes its function of separating the crop lines, that in the majority of times are entangled with leaves, bent stalks from other planting rows, etc. The embodiment described herein shows a row divider containing two "lollypops" provided in V, but naturally, there can be provided other types of row dividers, such as row dividers comprising only one "lollypop" or more than two "lollypops". Furthermore, the row dividers may further comprise other elements not described and represented herein, such as leaf cutting discs, electric or hydraulic driving motors, lines for transmission of electrical current or hydraulic fluid, etc., that were intentionally omitted for better clarity of the represented embodiment and concision of this description.

The row dividers 30, 30' may be positioned angularly relatively to the horizontal or to the vertical, such being due to the fact that the harvesting machines, such as the sugarcane harvesting machines, generally have a height adjustment with relation to the ground, and therefore, it is desirable that the row dividers have this inclination to better adapt to the adjustments of the machine with relation to the ground and avoid that they touch the ground when the machine is in transit, that is, when it is not harvesting, as well as to allow the angling of the base cutting discs with relation to the variations of the ground surface, as will become clearer along this specification. The inclination angles, both vertical and horizontal, may vary according to design specifications, are particularly provided in the range of 40° to 45°, and particularly about 42°, with relation to the horizontal inclination angle $\alpha$, and 10° to 15°, and particularly about 12°, in relation to the vertical inclination angle $\beta$. This angling can be fixed and determined by the assembly of the divider on the structure 20, as well as, in an alternative embodiment (not shown herein), the angling may vary with relation to the structure 20 by means of adjustments using articulated arms driven by hydraulic or pneumatic cylinders, for example.

Positioned transversally and behind the said one and preferably two row dividers 30, 30', within the opening, there is provided a roller 40 comprising multiple projections 41, 42, 43 of various geometries, sizes, spacing and arrangements and which purpose is to convey the harvested plants towards the inside of the opening, thereby avoiding the plants from deviating to the outside of the opening, both in the lateral sense and above the limits of the height defined by the roller 40. The height of the roller 40 and its distance from the row dividers 30, 30' may vary according to design specifications, provided that is has an adequate height and distance such that the plants being harvested are directed towards the inside of the opening and in the opposite sense to that of the harvest C. Therefore, the turning direction and the speed of rotation of the roller 40 should also be determined for this purpose. The driving for rotation of the roller 40, therefore, may be provided by any adequate means, such as electric motors or, preferably, by hydraulic motors, and lines of transmission of power or hydraulic fluid were also omitted in the representation of the embodiment shown in the figures for purposes of increased clarity. Furthermore, the multiple projections 41, 42, 43 may present specific geometries intended to realize efficiently the function of conveying the plants that are being harvested towards the inside of the opening, and such geometries may be determined by design specifications or there may be employed roller geometries already known in the art.

In the sequence of roller 40 there is provided one, and particularly a pair, of cutting discs 50, 50' that are positioned within the said opening for receiving plants, where both of the cutting discs are preferably aligned with one another transversally, with the diameter of each cutting disc being provided to leave no significant space therebetween, there being understood herein a relevant space between the cutting discs may compromise the adequate cutting of a plant such that the same might enter the machine without being cut. The cutting discs may be conventional cutting discs found in the market, comprising multiple blades to warrant the cutting of the plants, particularly stalky and tall plants, such as sugarcane and sweet sorghum. Furthermore, the rotation of the discs should be such as to warrant that the plants, upon being cut, be pushed or conveyed towards the inside of the opening, and in that regard, according to the representation of FIG. 1, while a cutting disc 50 presents a rotation in the anti-clockwise direction, the cutting disc 50' presents a rotation in the clockwise direction. The function of such cutting discs is well known and is intended to cut the plant next to or at its base, for a better yield of the harvest and to avoid that "stumps" be left in the field. The driving of the cutting discs may be provided by any adequate known means, such as by hydraulic or electric motors, or yet, if it is desired to have a pairing of the rotation of both cutting discs to avoid that their blades contact one another due to the proximity therebetween, there may also be provided a gearbox 52 for that purpose. In the same manner as explained for the remaining elements of the header, the driving means of the cutting discs are represented in a simplified manner, for better clarity of the figures, and in that regard there were omitted motors, hydraulic transmission lines, etc.

The cutting discs 50, 50' are associated to the gearbox 52 by means of a shaft 51. This shaft may also be associated, for example, to an element that extends axially and radially outside with relation to the shaft, commonly designated as spline (not shown), to aid the operation of introduction of the plants towards the opening and into the machine. An example of a spline associated to the shaft of the cutting disc is disclosed, for example, in publication WO 2014/127005, incorporated herein as reference.

Behind the cutting discs and positioned near the ground, there is provided a roller 60 to raise the cut plants such that they enter the machine, and in a position above and generally in front of this roller 60, there is provided a roller 70 to transport the cut plants towards the inside of the machine. The roller 60 to raise the cut plants may be a roller comprising two or more tabs such that the plants, upon being cut and placed in a relatively horizontal position and next to the ground, be raised by the cut side and then, on meeting the transport roller 70 in that raising operation, be conveyed to the inside of the machine. Therefore, the sense of rotation of the rollers should be such as to allow the ingress of the cut plants into the machine and, according to the orientation and arrangement disclosed in FIG. 2, the raising roller 60 should rotate clockwise, while the transport roller 70 should present a rotation in the anti-clockwise direction. The driving of the rollers may be made by conventional means, such as by hydraulic and/or electric motors, and both the driving means and the hydraulic and/or electric transmission lines were also omitted for better clarity and concision of this specification.

In an alternative embodiment, the header also comprises a pair of conveyor rollers 80, 90 provided behind the raiser roller 60, such as in the embodiment represented in the figures. The inclusion of an additional pair of conveyor rollers, according to this additional embodiment, may be desirable to better direct the cut plants towards the inside of the opening of the machine that will receive those plants. In this regard, the lower conveyor roller 80 may be a conventional fixed roller, while the upper conveyor roller 90 may be a floating roller, that is, able to vary its distance with relation to the lower roller, with its shaft mounted on guides 91 provided in the structure. Naturally, this fluctuation of the upper roller 90 may present, in addition to a limitation of course defined by the guides, also a resistance in the closing sense using a spring (not shown), for example. This variation of the size of the opening defined by the lower conveyor roller 90 and the upper roller 91 may be desirable to adjust the amount, which may vary depending on the amount of plants harvested, as well as depending on the variation of the amount of foliage that comes together with the plant. In the same manner, the additional pair of conveyor rollers 80, 90 should have a sense of rotation towards the inside of the machine, such as described for the previous raiser roller 60 and conveyor roller 70, as well as the driving means of such additional conveyor rollers 80, 90 may be realized by those skilled in the art, such as by means of hydraulic and/or electric motors, or yet by a gear drive.

In an additional embodiment, the first conveyor roller 70 may also be a floating conveyor roller, mounted on guides 71, and its function and operation are equal to those already described above for the second conveyor roller 90.

As may be observed in the figures, and particularly in FIG. 1, the opening A presents a determined width defined by the row dividers 30, 30' and tapers towards the conveyor roller 70, since the entry opening of the harvesting machine is smaller both in width and in height, in that regard, in the internal part defined by the opening until the cutting discs, there may be provided walls (not shown) for the plants to be conveyed towards the cutting discs and also to avoid their entangling or hooking in parts of the structure 20 and/or of the elements provided therein. Furthermore, according to this embodiment of the invention, the opening A has a fixed width, and may present a distance between the row dividers that might be adequate to harvest only one planting row or two planting rows or even more than two planting rows.

Figure 4:
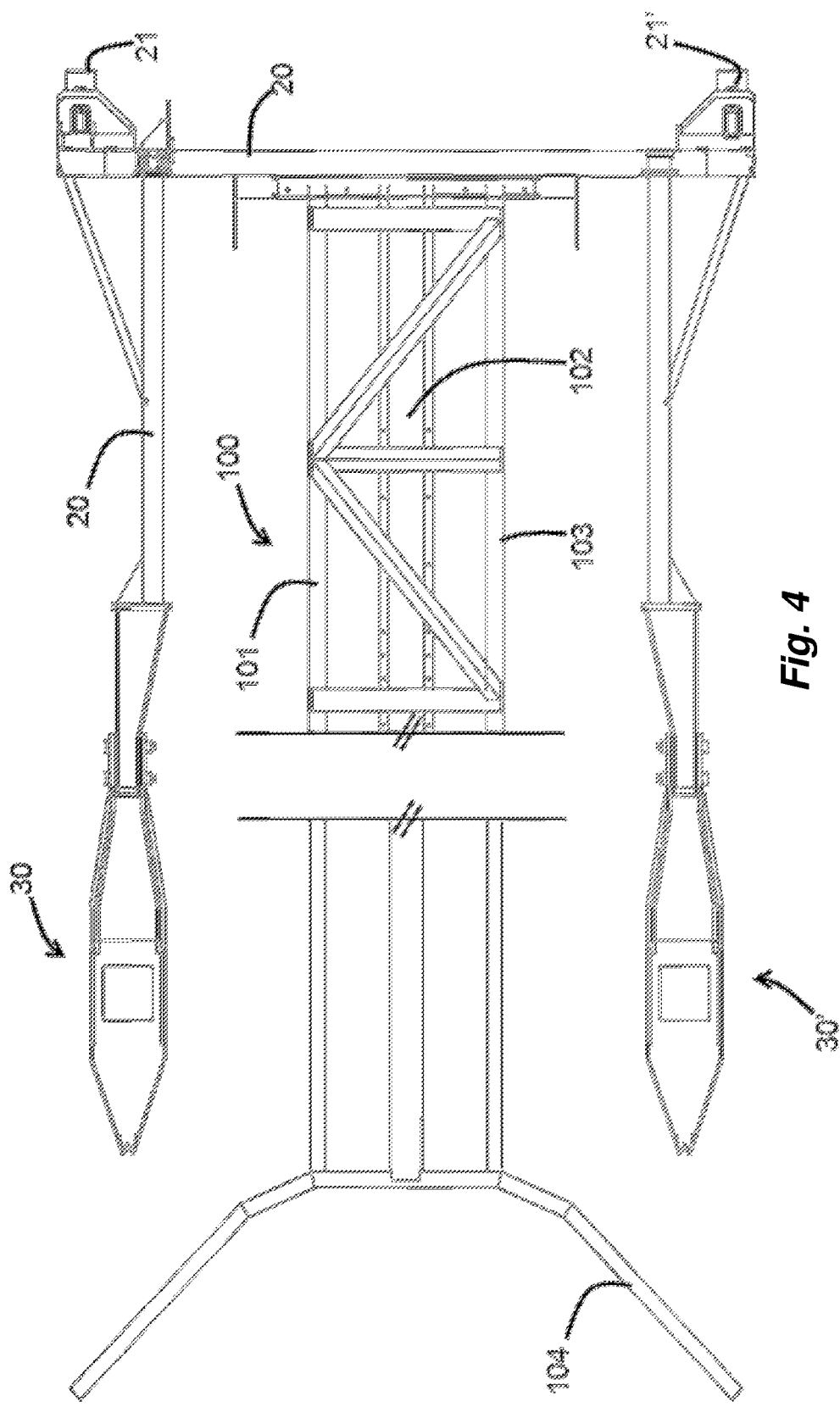
FIG. 4 is another top view of the header of FIG. 1, showing a stem for bending plants, in accordance with an exemplary embodiment of the present invention.

In another alternative embodiment of the invention, the header additionally comprises a stem to bend the plants in order to facilitate the cutting at the base thereof. The stem 100 is better represented in FIGS. 2 and 4 and may consist, for example, in a long structure comprising one or more metallic beam 101, 102, 103 that extend towards the most frontal part of the header in the approximate shape of a "C" 104 that is preferably positioned in front of the row dividers 30, 30' at a height of approximately ¾ in relation to the total height of the row dividers. As may appreciated by one skilled in the art, the stem will contact the stalky plants before the same contacting the row dividers 30, 30' and the roller 40 to direct the plants towards the interior of the opening. Therefore, the stem 100 will incline the plants, in order to both facilitate their introduction into the opening and the cutting performed at the base.

Figure 5:
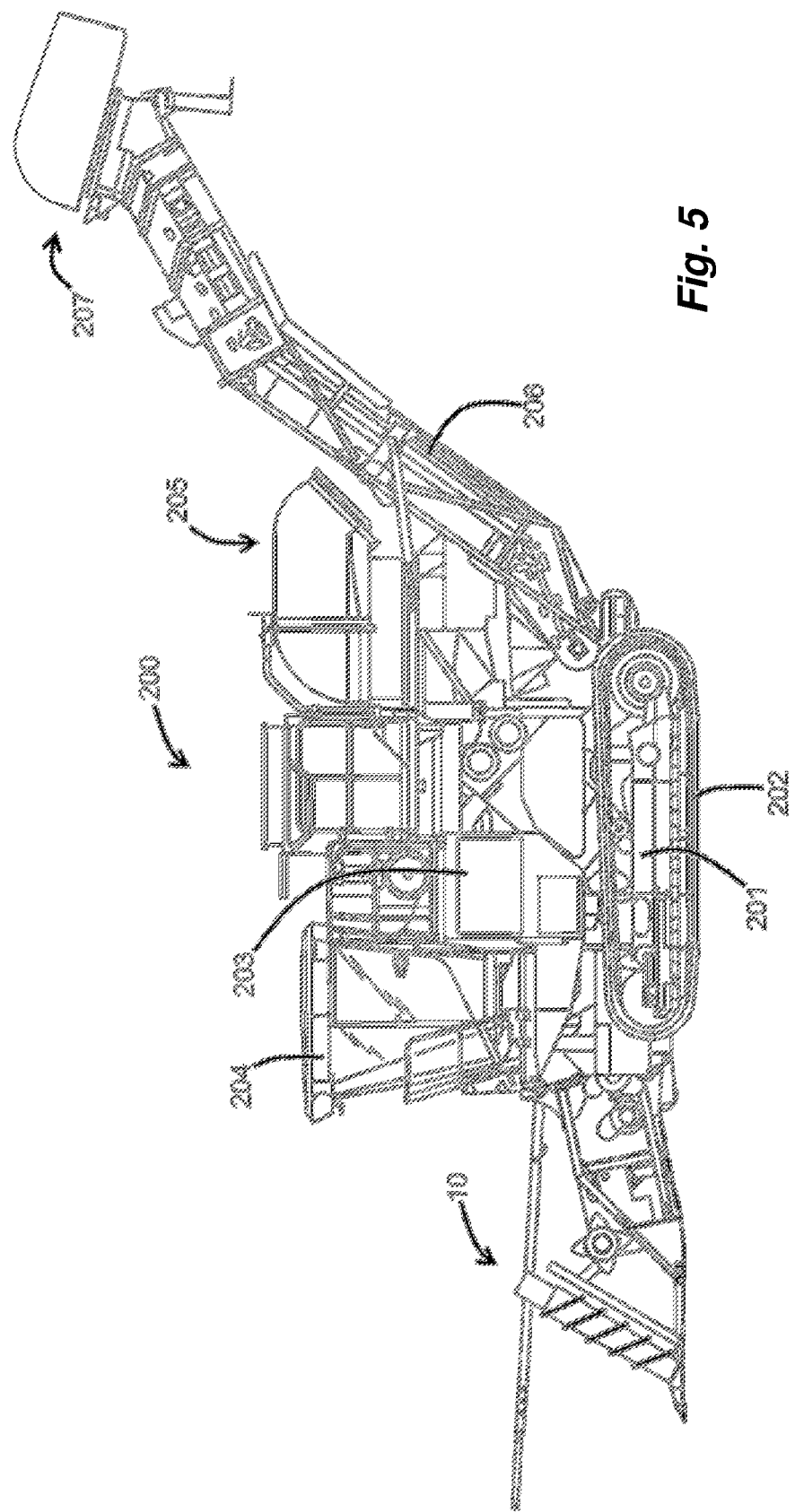
FIG. 5 is a side view of the header of FIG. 1 assembled in a harvesting machine, in accordance with an exemplary embodiment of the present invention.

FIG. 5 illustrates the header attached to a harvesting machine, such as a sugarcane harvester, in accordance with an exemplary embodiment of the present invention. The harvesting machine 200 may be a machine known from the prior art, such as a harvester commercialized by the mark Case IH, of CNH Industrial N.V., which was modified to receive a set of rollers in its front part, at the entry portion of the machine, such as described in patent application US 2014/0174048. The harvester comprises a chassis 201 mounted on wheels or tracks 202, which are respectively connected to front and rear axles, a driving motor 203, an operator cabin with controls 204, a primary cleaning extractor system 205, a stalk material sections conveyor roll 206 to transport the stalk material sections cut from, for example, sugarcane, and a secondary cleaning extractor and stalk material sections ejection system 207 for example a transshipment (not represented). Such elements are well known in the art.

The attachment of the header 10 to the harvesting machine 200, as already mentioned, may be performed by conventional means, using fastening means already known and/or standardized in the market, such as hooks, locks, flanges, bolts, etc. The rear end of the structure of the header 10 is attached to the harvesting machine 200 forward of the front axle of the harvesting machine 200 (FIG. 5). The fastening may be performed, for example, by means of a standard fastening of a forage header to a forage harvester. In this regard, alternatively, the harvesting machine 200 may be a forage harvester commercialized with the mark New Holland, of CNH Industrial N.V.

In operation, the header as described herein follows a process that is similar to that known from the sugarcane harvesting machines, but can be assembled and disassembled in a harvesting machine, such as a harvesting machine that was altered to receive a header, which follows the harvesting direction C. The plants are forcibly inclined by the stem 100, when present, and the planting rows are separated by the row dividers 30, 30'. The roller 40 to direct the plants towards the interior of the opening, by way of its multiple projections 41, 42, 43, forces the plants already inclined but still not cut, downwards and towards the inlet opening A, so that the cutting discs 50, 50' may be able to realize an efficient cutting at the base or close to the base of the plants. The plants thus cut are laid in an almost horizontal position on the ground, and the raising roller 60 raises the cut plants from the ground to the interior of the machine, which can also have additional conveyor rollers 90, where the conveyor roller 70 provided above and generally in front of the raiser roller, avoids that the cut plants be excessively raised, which could cause them to rise above the height of the discharge opening B and would not be properly conveyed to the interior of the machine through the discharge opening B of the header 10, at the rear end of the structure. The raising roller 60 and the conveyor rollers 70, 90 are positioned in front of the discharge opening B such that the conveyor rollers 70, 90 are located adjacent to the rear end of the structure (FIG. 2).

As was left clear from the above description, the header provides the possibility of being mounted in a simple and fast manner in a harvest machine, such as a sugarcane harvesting machine, providing a greater flexibility of use and less time to alter the machine depending on the purpose of the crop.

Although the invention was described with relation to its particular embodiments, those skilled in the art, based on the teachings disclosed herein, may realize a series of alterations or variations without however deviating from the principles of the invention. For example, the different elements having been described may be combined in a different form not contemplated in the illustrated embodiments, leading to the same technical effect. Therefore, the attached claims should be interpreted broadly, covering all the equivalents of the invention.

What is claimed is:

1. A header for a harvesting machine, comprising:
an inlet opening and a discharge opening;
at least two row dividers spaced from one another in a transversal direction and at a predetermined distance, the at least two row dividers defining the inlet opening to receive plants;
at least one roller comprising multiple projections to collect and direct the plants downwards and towards the inlet opening, the multiple projections being positioned transversally with relation to the inlet opening and behind the at least two row dividers;
a driver for driving the at least one roller;
at least two base cutting discs positioned within the inlet opening to receive plants, each of the at least two cutting discs positioned in a position substantially transversally aligned in relation to the other of the at least two base cutting discs in relation to the inlet opening;
a driver for driving the at least two base cutting discs;
a raising roller having a horizontal axis of rotation that is positioned behind and beneath the at least two base cutting discs; and
at least one conveyor roller positioned above the raising roller, which is configured to raise the cut plants towards said at least one conveyor roller, and said at least one conveyor roller is configured to transport the cut plants to an inside of the harvesting machine through the discharge opening, and the raising roller and the at least one conveyor roller are positioned in front of the discharge opening;
wherein the at least two row dividers, the at least one roller comprising multiple projections, the at least two base cutting discs, the driver for the at least two base cutting discs, the raising roller, and the at least one conveyor roller form an assembly mounted on a structure that is configured for removably connecting to the harvesting machine machine; and
wherein the harvesting machine has a front axle, and the structure is configured for removably connecting to the harvesting machine at a location which is forward of the front axle.

2. The header according to claim 1, wherein the harvesting machine is a sugarcane or sorghum harvesting machine.

3. The header according to claim 1, wherein the at least two row dividers comprise two "lollypops" positioned adjacent to one another forming a V.

4. The header according to claim 1, wherein the driver for the at least two base cutting discs comprises a hydraulic motor, an electric motor, or a gearbox.

5. The header according to claim 1, further comprising two conveyor rollers provided one above the other and positioned behind the roller provided to raise the cut plants.

6. The header according to claim 1, wherein said at least one conveyor roller includes two conveyor rollers and at least one of the two conveyor rollers is a floating roller.

7. The header according to claim 1, further comprising a stem that extends to the most frontal portion of the header to bend the plants before the same being cut.

8. The header according to claim 1, further including a connecting shaft between the at least two base cutting discs and the driver for driving the at least two base cutting discs.

9. The header according to claim 1, wherein the harvesting machine is a forage harvester.

10. A header for an agricultural machine, comprising:
an inlet opening and a discharge opening;
at least two row dividers spaced from one another in a transversal direction and by a predetermined distance, the at least two row dividers defining the inlet opening to receive plants;
at least two base cutting discs positioned within the inlet opening to receive plants, each of the at least two base cutting discs positioned in a substantially transversally aligned position in relation to one another and in relation to the inlet opening;
a roller having a horizontal axis of rotation that is positioned behind and beneath the at least two base cutting discs to raise the cut plants; and
at least one conveyor roller positioned above the roller to raise the plants, to transport the cut plants to an inside of the agricultural machine through the discharge opening, and the roller and the at least one conveyor roller are positioned in front of the discharge opening,
wherein the at least two row dividers, the at least two base cutting discs, the roller, and the conveyor roller form an assembly mounted on a structure that is configured for removably connecting to the agricultural machine machine; and
wherein the agricultural machine has a front axle, and the structure is configured for removably connecting to the agricultural machine at a location which is forward of the front axle.

11. The header according to claim 10, wherein the agricultural machine is one of a sugarcane harvesting machine and a forage harvester.

12. The header according to claim 10, further comprising two conveyor rollers provided one above the other and positioned behind the roller provided to raise the cut plants.

13. The header according to claim 12, wherein at least one of the conveyor rollers is floating.

14. The header according to claim 10, further comprising a stem that extends towards the most frontal part of the header to bend the plants before cutting.

15. The header according to claim 10, wherein the structure has a front end and a rear end, the discharge opening is located at the rear end of the structure, and the at least one conveyor roller is located adjacent to the rear end of the structure.

16. The header according to claim 1, wherein the structure has a front end and a rear end, the discharge opening is located at the rear end of the structure, and the at least one conveyor roller is located adjacent to the rear end of the structure.

* * * * *